(12) United States Patent
Watanabe et al.

(10) Patent No.: US 6,169,625 B1
(45) Date of Patent: Jan. 2, 2001

(54) SATURABLE ABSORPTION TYPE OPTICAL SWITCH AND CONTROLLING METHOD THEREFOR

(75) Inventors: Seiji Watanabe; Shohei Yamaguchi, both of Toyko (JP)

(73) Assignee: NEC Corporation, Tokyo (JP)

( * ) Notice: Under 35 U.S.C. 154(b), the term of this patent shall be extended for 0 days.

(21) Appl. No.: 09/264,046

(22) Filed: Mar. 8, 1999

(30) Foreign Application Priority Data

Mar. 13, 1998 (JP) .................................................. 10-063386

(51) Int. Cl.$^7$ ....................................................... G02F 1/03
(52) U.S. Cl. ............................................. 359/244; 359/108
(58) Field of Search ..................................... 359/243, 244, 359/108; 385/1

(56) References Cited

U.S. PATENT DOCUMENTS 6,091,536 * 7/2000 Usami et al. .......................... 359/244

FOREIGN PATENT DOCUMENTS

0942319 * 9/1994 (EP) .
2776083 * 12/1999 (FR) .
61-38935 2/1986 (JP) .
8-082813 3/1996 (JP) .

OTHER PUBLICATIONS

Optical Noise Reduction by a semiconductor waveguide Saturable Absorber, Hashimoto, 998, Technical Digest of CPT '98 in Cooperation with IEICE Electronics Society & EEE LEOS & OSA, pp. 215–216.

* cited by examiner

Primary Examiner—Mark Hellner
(74) Attorney, Agent, or Firm—Scully, Scott, Murphy & Presser

(57) ABSTRACT

An optical switch includes a saturable absorption type optical element provided with a saturable absorption region, and a band-block optical filter to which signal light composed of at least one wavelength light having an optical power in the absorption region of the saturable absorption type optical element and control light whose optical power is set such that a total power of the signal light and the control light comes within a transmission region of the saturable absorption type optical element and which is composed of either one of two wavelength lights different from that of the signal light are inputted and which transmits therethrough the signal light and the control light which is composed only of one of the wavelength lights and outputs the transmitted signal light and control light to the saturable absorption type-optical element. ON/OFF of the signal light is controlled by varying the wavelength of the control light.

16 Claims, 4 Drawing Sheets

SATURABLE ABSORPTION TYPE OPTICAL SWITCH AND CONTROLLING METHOD THEREFOR

BACKGROUND OF THE INVENTION

1. Field of the Invention

This invention relates to a saturable absorption type optical switch including a semiconductor element provided with a saturable absorption region and a controlling method therefor suitable for use with optical communication, optical information processing, optical measurement and so forth.

2. Description of the Related Art

In recent years, demand has been increasing for development of technology of a transmission system for a data train composed of optical pulses having a time width smaller than several [ps] or a repetition frequency exceeding several tens [Gb/s] to hundred [Gb/s] and a controlling method therefor as basic technology for very high speed optical communication or optical information processing. It is to be noted that [b/s] is a representation of a quantity of pulses per second in units of a bit.

In such a situation as described above, it is required to produce stable and coherent optical pulses as well as to establish production technology for a very high speed optical pulse data train, technology for dividing and extracting a very high speed optical pulse data train, and technology for recovery of the waveform of a very high speed pulse data train which has been distorted with respect to time during transmission. Particularly for the division and extraction and the recovery of the waveform of a very high speed optical pulse data train, an optical switch which operates at a very high speed is required. Normally, since it is difficult to electrically control such an optical switch as mentioned above from a restriction in the response speed, it is desirable to control it with an optical signal.

As an optical switch of the type mentioned, an optical switch has been proposed which includes a semiconductor element (hereinafter referred to as saturable absorption type optical element) provided with a saturable absorption region. The optical switch is hereinafter referred to as saturable absorption type optical switch. The saturable absorption type optical switch is a semiconductor optical element whose output power characteristic with respect to an input power has some non-linearity as shown in FIG. 1 due to its saturable absorption effect.

If signal light of a low optical power is inputted to a saturable absorption type optical element whose output power characteristic has some non-linearity, then the signal light is acted upon and attenuated by a strong absorbing action (absorption region). On the other hand, if signal light of a high optical power is inputted, then the signal light is transmitted through the saturable absorption type optical element because the absorbing action of the saturable absorption type optical element is saturated (transmission region). Detailed technology of the saturable absorption type optical element is disclosed, for example, in Yoichi Hashimoto, "Optical noise reduction by a semiconductor waveguide saturable absorber", Technical Digest of CPT'98, Jan. 12–14, 1998, in corporation with IEICE Electronics society & IEEE LEOS & OSA, pp.215–216.

As shown in FIG. 2, a conventional saturable absorption type optical switch is composed only of a saturable absorption type optical element. If signal light (wavelength λS) and control light (wavelength λC) are inputted to the saturable absorption type optical switch with the power of the signal light set within the absorption region shown in FIG. 1 and with the total power of the signal light and the control light set within the transmission region shown in FIG. 1, then absorption or transmission of the signal light can be controlled by ON/OFF of the control light.

However, such a conventional saturable absorption type optical switch as described above has a problem in that, if an optical amplifier which is popularly used in an optical communication system to control the output power to a fixed level is disposed in a preceding stage, then even if the power of the control light is controlled ON/OFF, since the power of the control light inputted to the saturable absorption type optical element is controlled to the fixed value by the optical amplifier, the saturable absorption type optical switch cannot operate as an optical switch.

SUMMARY OF THE INVENTION

Accordingly, it is an object of the present invention to provide a saturable absorption type optical switch and a controlling method therefor which allow ON/OFF control of signal light without controlling the power of control light ON/OFF.

In order to attain the object described above, according to the present invention, there is provided a saturable absorption type optical switch, comprising a saturable absorption type optical element provided with a saturable absorption region, and a band-block optical filter to which signal light composed of at least one wavelength light having an optical power in the absorption region of the saturable absorption type optical element and control light whose optical power is set such that a total power of the signal light and the control light comes within a transmission region of the saturable absorption type optical element and which is composed of either one of two wavelength lights different from that of the signal light are inputted and which transmits therethrough the signal light and the control light which is composed only of one of the wavelength lights and outputs the transmitted signal light and control light to the saturable absorption type optical element.

In the saturable absorption type optical switch having such a construction as described above, since the optical power of the signal light is within the absorption region of the saturable absorption type optical element, even if only the signal light is inputted to the saturable absorption type optical element, it cannot be transmitted through the saturable absorption type optical element. Meanwhile, since the optical power of the control light is set such that the total power of the signal light and the control light may be within the transmission region of the saturable absorption type optical element, if the control light and the signal light are inputted simultaneously to the saturable absorption type optical element, then they are transmitted through the saturable absorption type optical element.

Since the band-block filter allows transmission therethrough only of the signal light and the control light which is compose of the one wavelength light, the control light which is composed of the other wavelength light is not inputted to the saturable absorption type optical element. Accordingly, transmission or absorption of the signal light by the saturable absorption type optical element can be controlled by varying the wavelength of the control light.

The above and other objects, features, and advantages of the present invention will become apparent from the following description with references to the accompanying drawings which illustrate examples of the present invention.

DETAILED DESCRIPTION OF THE PREFERRED EMBODIMENTS (First Embodiment)

Figure 3:
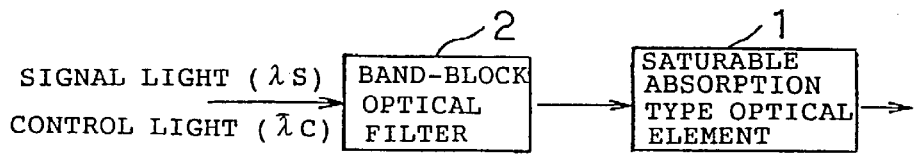
FIG. 3 is a block diagram showing a construction of a first embodiment of a saturable absorption type optical switch of the present invention.

Referring to FIG. 3, a saturable absorption type optical switch of the present embodiment is constructed such that band-block optical filter 2 for blocking transmission of wavelength light of a predetermined band therethrough is additionally provided in a stage preceding to saturable absorption type optical element 1. Similarly as in the prior art, signal light and control light are inputted to band-block optical filter 2.

Next, operation of the saturable absorption type optical switch shown in FIG. 3 is described with reference to FIGS. 4 to 6.

Figure 4:
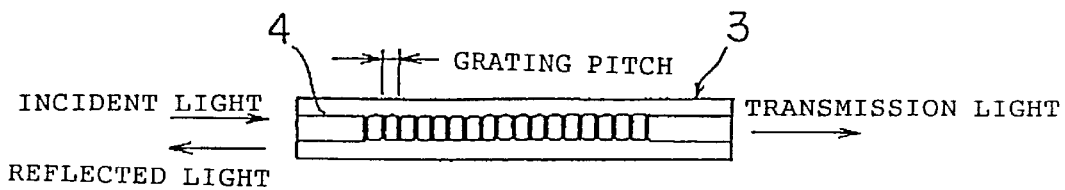
FIG. 4 is a view showing an example of a construction of a band-block optical filter shown in FIG. 3.

Band-block optical filter 2 is formed from, for example, optical fiber 3 having core 4 on which gratings are formed as shown in FIG. 4. The gratings are formed such that the refractive index of core 4 may vary periodically, and operates as a reflector having a strong frequency selectivity. Light inputted to such an optical fiber as just described is partly reflected at variation points of the refraction index of the gratings, and it is reflected with a higher strength at wavelength light thereof with which the phases of the reflected lights coincide with one another.

Figure 5:
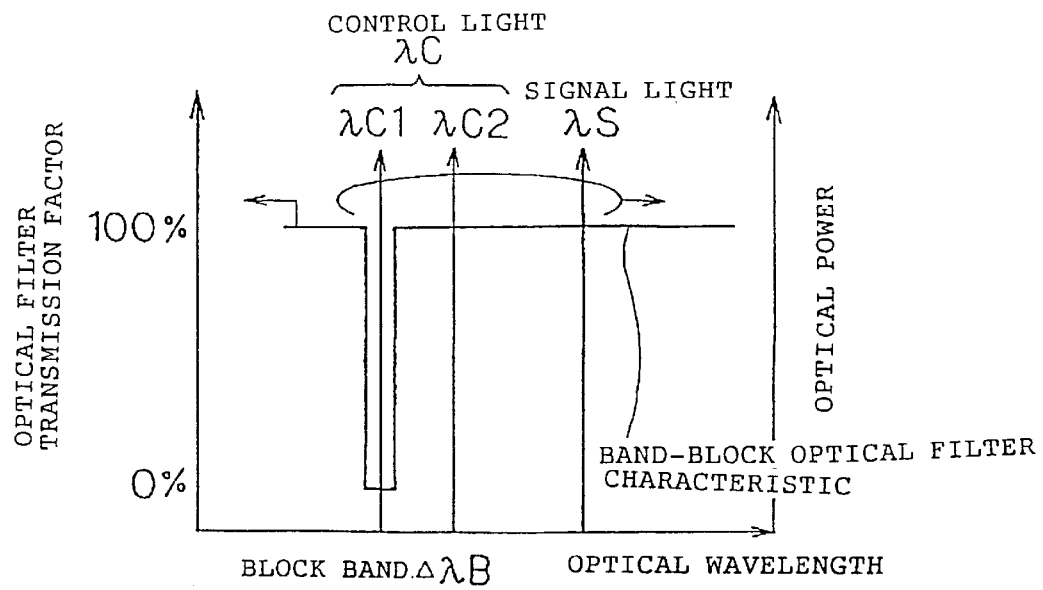
FIG. 5 is a graph illustrating a filter characteristic of the band-block optical filter shown in FIG. 3.

Accordingly, depending upon the value of the grating pitch shown in FIG. 4, band-block optical filter 2 can be provided with a characteristic (block band $\Delta\lambda B$) of blocking transmission therethrough of wavelength light of a desired band as shown in FIG. 5.

For example, wavelength $\lambda C$ of control light is set to wavelength $\lambda C1$ within block band $\Delta\lambda B$ of band-block optical filter 2 and wavelength $\lambda C2$ outside block band wavelength $\Delta\lambda B$.

Figure 1:
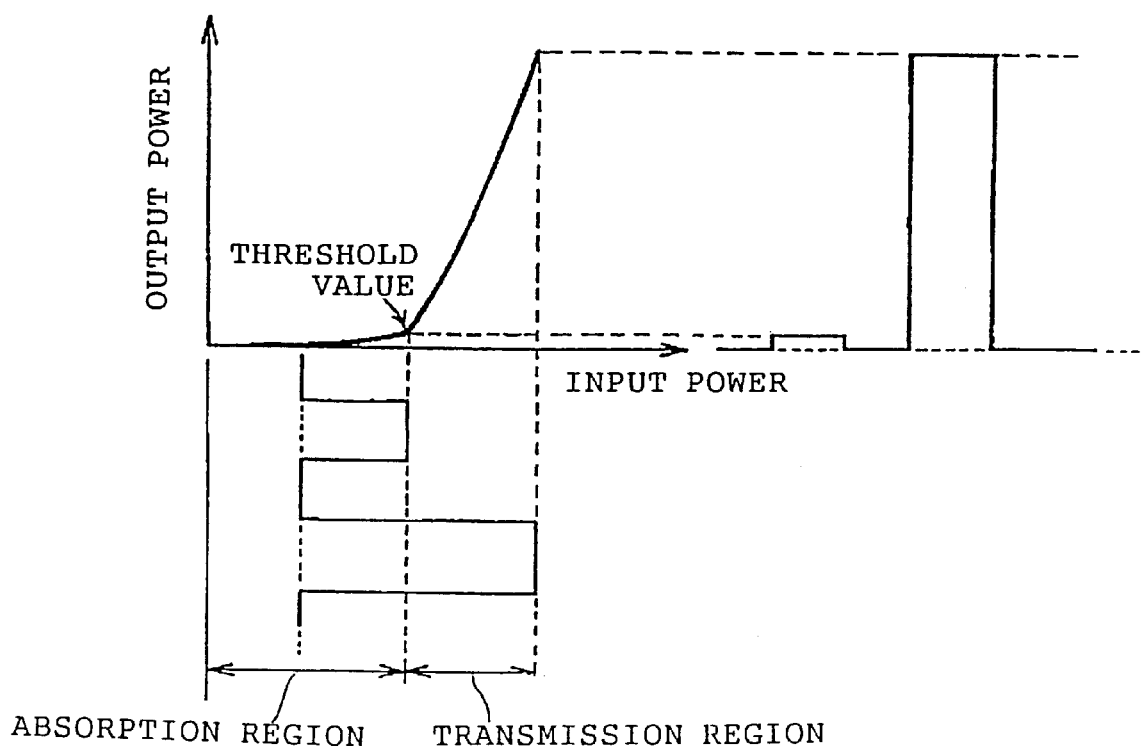
FIG. 1 is a graph illustrating a transmission characteristic of a saturable absorption type optical element.
Figure 2:
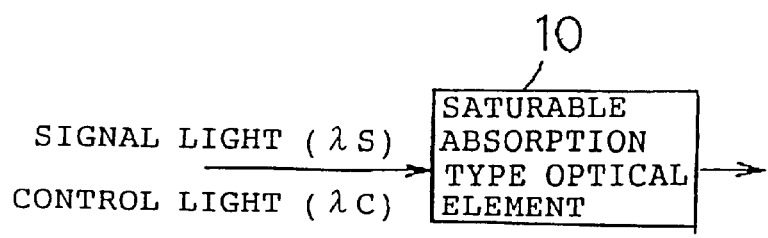
FIG. 2 is a block diagram showing a construction of a conventional saturable absorption type optical switch.
Figure 6:
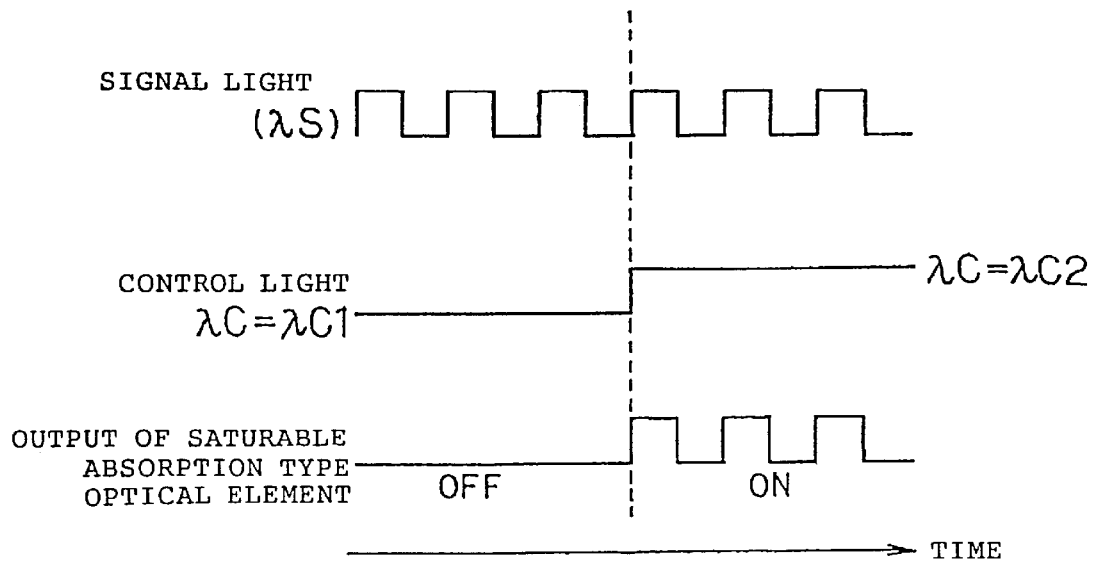
FIG. 6 is a timing chart illustrating a manner of switch operation of the saturable absorption type optical switch shown in FIG. 3.
Figure 7:
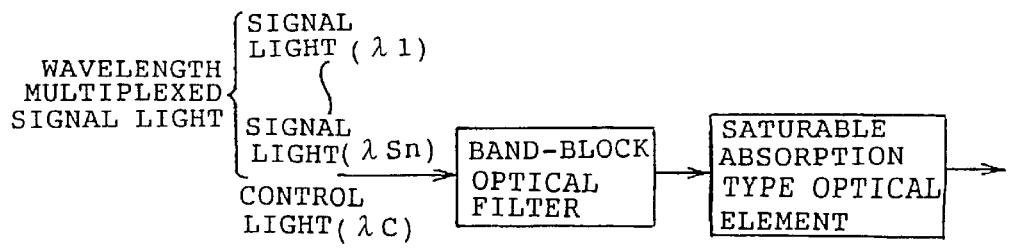
FIG. 7 is a block diagram illustrating another example of sign al light inputted to the saturable absorption type optical switch shown in FIG. 3.

As shown in FIG. 6, where wavelength $\lambda C$ of the control light is set to $\lambda C1$, since the control light cannot be transmitted through band-block optical filter 2, it is intercepted while only the signal light is inputted to saturable absorption type optical element 1. In this instance, if the power of the signal light is set within the absorption region (refer to FIG. 1) of saturable absorption type optical element 1, then the signal light is absorbed by and cannot be transmitted through saturable absorption type optical element 1.

On the other hand, where wavelength $\lambda C$ of the control light is set to $\lambda C2$, since the control light is transmitted through band-block optical filter 2, the signal light and the control light are simultaneously inputted to saturable absorption type optical element 1. In this instance, if the total power of the power of the signal light and the power of the control light is set so as to come within the transmission region (refer to FIG. 1) of saturable absorption type optical element 1, then the signal light can be transmitted through saturable absorption type optical element 1.

Accordingly, with the construction of the present embodiment, transmission or absorption of the signal light by the saturable absorption type optical element can be controlled by varying the wavelength of the control light. Consequently, since ON/OFF of the saturable absorption type optical switch can be controlled without varying the power of the control light, the present embodiment can be used for an optical communication system which includes an optical amplifier whose output power is controlled to a fixed value.

It is to be noted that, while the signal light in the foregoing description has one wavelength of wavelength $\lambda S$, the signal light may alternatively be wavelength multiplexed signal light composed of a plurality of wavelength lights of wavelengths $\lambda S1$ to $\lambda Sn$. Also in this instance, if the power of the wavelength multiplexed signal light is set within the absorption region of saturable absorption type optical element 1 (where the control light has wavelength $\lambda C1$) and the total power of the power of the wavelength multiplexed signal light and the power of the control light is set so as to come within the transmission region of saturable absorption type optical element 1 (where the control light has wavelength $\lambda C2$), ON/OFF of the saturable absorption type optical switch can be controlled by varying the wavelength of the control light similarly as described above.

(Second Embodiment)

Figure 8:
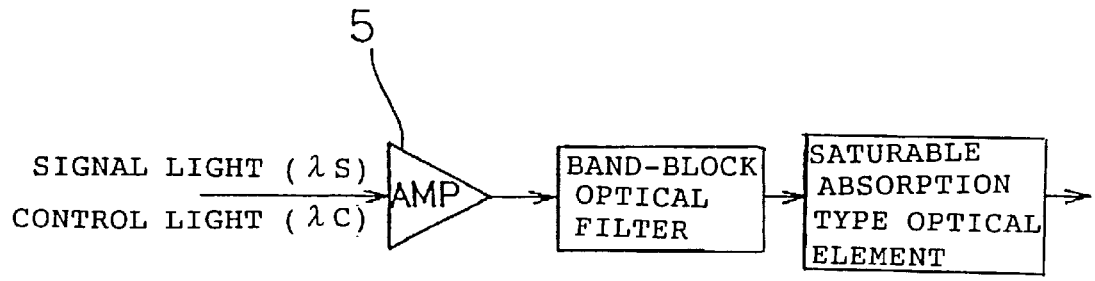
FIG. 8 is a block diagram showing a construction of a second embodiment of the saturable absorption type optical switch of the present invention.

A saturable absorption type optical switch of the second embodiment shown in FIG. 8 is constructed such that optical amplifier 5 for controlling the output power to a fixed level is disposed in a stage preceding to the saturable absorption type optical switch of the first embodiment. The remaining construction of the saturable absorption type optical switch of the present embodiment is similar to that of the first embodiment, and accordingly, overlapping description of the same is omitted here.

With the construction of the second embodiment, since the optical power inputted to the band-block optical filter is controlled to a predetermined fixed value by optical amplifier 5, the power of the control light (wavelength $\lambda C2$) inputted to the saturable absorption type optical element is kept fixed, and the saturable absorption type optical switch always operates stably.

(Third Embodiment)

Figure 9:
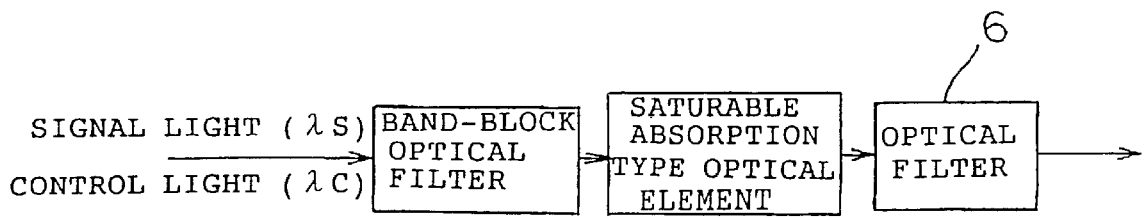
FIG. 9 is a block diagram showing a construction of a third embodiment of the saturable absorption type optical switch of the present invention.

A saturable absorption type optical switch of the third embodiment shown in FIG. 9 is constructed such that optical filter 6 for intercepting control light (wavelength $\lambda C2$) is provided in a stage following the saturable absorption type optical switch of the first embodiment. The remaining construction of the saturable absorption type optical switch of the present embodiment is similar to that of the first embodiment, and accordingly, overlapping description of the same is omitted here.

With the constructions of the first embodiment and the second embodiment described above, when the saturable absorption type optical switch exhibits an ON state, signal light (wavelength λS) and control light (wavelength λC2) are outputted from the saturable absorption type optical switch. In the present embodiment, the control light (wavelength λC2) outputted from the saturable absorption type optical element is intercepted by means of optical filter 6 while only the signal light is transmitted through optical filter 6. By the construction just described, an influence of the control light upon an apparatus which is disposed in a stage following the saturable absorption type optical switch can be eliminated.

It is to be noted that, while the present embodiment has a construction wherein optical filter 6 is added to the construction of the first embodiment, a similar effect can be achieved even if optical filter 6 is added to the construction of the second embodiment.

While a preferred embodiments of the present invention have been described using specific terms, such description is for illustrative purpose only, and it is to be understand that changes and variations may be made without departing from the spirit or scope of the following claims.

What is claimed is:

1. A saturable absorption type optical switch, comprising:
   a saturable absorption type optical element provided with a saturable absorption region; and
   a band-block optical filter which receives signal light and control light, said control light being composed of one of two predetermined wavelengths, and outputs the signal light and only the control light containing one of said two predetermined wavelengths to said saturable absorption type optical element, wherein
      said signal light is composed of at least one wavelength light having an optical power in an absorption region of said saturable absorption type optical element,
      said control light has an optical power that a total power of the signal light and the control light comes within a transmission region of said saturable absorption type optical element.

2. The saturable absorption type optical switch as claimed in claim 1, further comprising an optical amplifier to which the signal light and the control light are inputted and which controls the total power of the signal light and the control light to be outputted to said band-block optical filter to a predetermined fixed value.

3. The saturable absorption type optical switch as claimed in claim 1, further comprising an optical filter for transmitting, of the signal light and the control light outputted from said saturable absorption type optical element, only the signal light therethrough.

4. The saturable absorption type optical switch as claimed in claim 2, further comprising an optical filter for transmitting, of the signal light and the control light outputted from said saturable absorption type optical element, only the signal light therethrough.

5. The saturable absorption type optical switch as claimed in claim 1, wherein said band-block optical filter includes an optical fiber having a core on which gratings are formed.

6. The saturable absorption type optical switch as claimed in claim 2, wherein said band-block optical filter includes an optical fiber having a core on which gratings are formed.

7. The saturable absorption type optical switch as claimed in claim 3, wherein said band-block optical filter includes an optical fiber having a core on which gratings are formed.

8. The saturable absorption type optical switch as claimed in claim 4, wherein said band-block optical filter includes an optical fiber having a core on which gratings are formed.

9. A controlling method for a saturable absorption type optical switch including a saturable absorption type optical element provided with a saturable absorption region to transmit or absorb signal light composed of at least one wavelength light, comprising the steps of:
   setting a power of the signal light within an absorption region of said saturable absorption type optical element;
   setting a power of control light for controlling absorption or transmission of the signal light by or through said saturable absorption type optical element so that a total power of the power of the control light and the power of the signal light may come within a transmission region of said saturable absorption type optical element; and
   transmitting, when the control light is set to one of wavelength lights different from the signal light, the control light together with the signal light so as to be outputted to said saturable absorption type optical element, but transmitting, when the control light is set to the other wavelength light different from the signal light, only the signal light so as to be outputted to said saturable absorption type optical element.

10. The controlling method for a saturable absorption type optical switch as claimed in claim 9, wherein the total power of the signal light and the control light is controlled to a predetermined fixed value.

11. The controlling method for a saturable absorption type optical switch as claimed in claim 9, wherein, of the signal light and the control light outputted from said saturable absorption type optical element, only the signal light is transmitted.

12. The controlling method for a saturable absorption type optical switch as claimed in claim 10, wherein, of the signal light and the control light outputted from said saturable absorption type optical element, only the signal light is transmitted.

13. The controlling-method for a saturable absorption type optical switch as claimed in claim 9, wherein a band-block optical filter including an optical fiber having a core on which gratings are formed is used for the band-blocking processing.

14. The controlling method for a saturable absorption type optical switch as claimed in claim 10, wherein a band-block optical filter including an optical fiber having a core on which gratings are formed is used for the band-blocking processing.

15. The controlling method for a saturable absorption type optical switch as claimed in claim 11, wherein a band-block optical filter including an optical fiber having a core on which gratings are formed is used for the band-blocking processing.

16. The controlling method for a saturable absorption type optical switch as claimed in claim 12, wherein a band-block optical filter including an optical fiber having a core on which gratings are formed is used for the band-blocking processing.

* * * * *